March 17, 1931.   H. A. TOULMIN, JR   1,796,636
MACHINE FOR MANUFACTURING BUILDING MATERIAL
Filed June 25, 1928   10 Sheets-Sheet 1

INVENTOR
HARRY A. TOULMIN, JR.
BY Toulmin & Toulmin
ATTORNEYS

March 17, 1931.  H. A. TOULMIN, JR  1,796,636
MACHINE FOR MANUFACTURING BUILDING MATERIAL
Filed June 25, 1928    10 Sheets-Sheet 3

March 17, 1931.  H. A. TOULMIN, JR  1,796,636
MACHINE FOR MANUFACTURING BUILDING MATERIAL
Filed June 25, 1928    10 Sheets-Sheet 5

INVENTOR
HARRY A. TOULMIN, JR.

BY Toulmin & Toulmin
ATTORNEYS

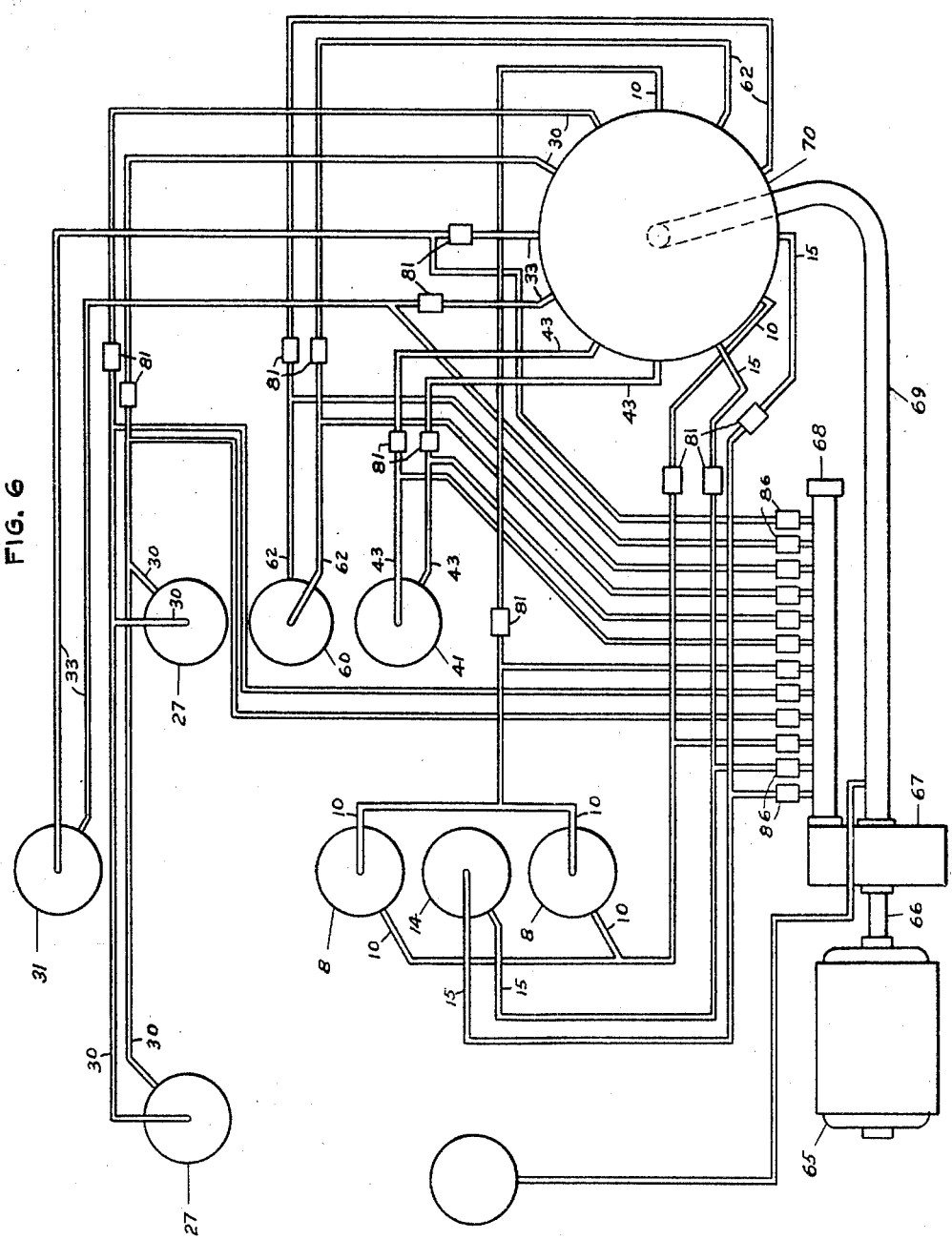

March 17, 1931. H. A. TOULMIN, JR 1,796,636
MACHINE FOR MANUFACTURING BUILDING MATERIAL
Filed June 25, 1928 10 Sheets-Sheet 7
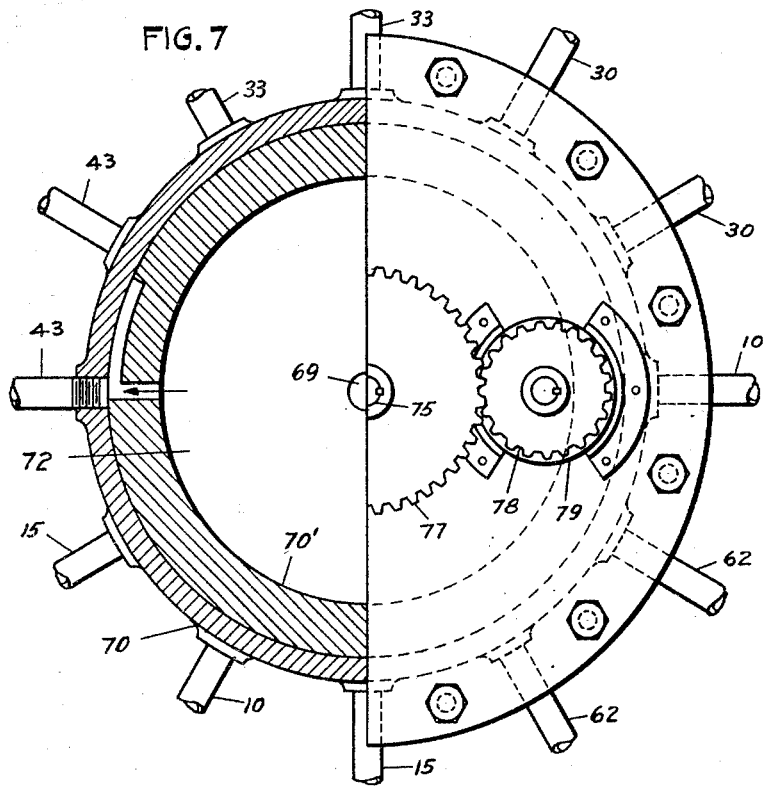
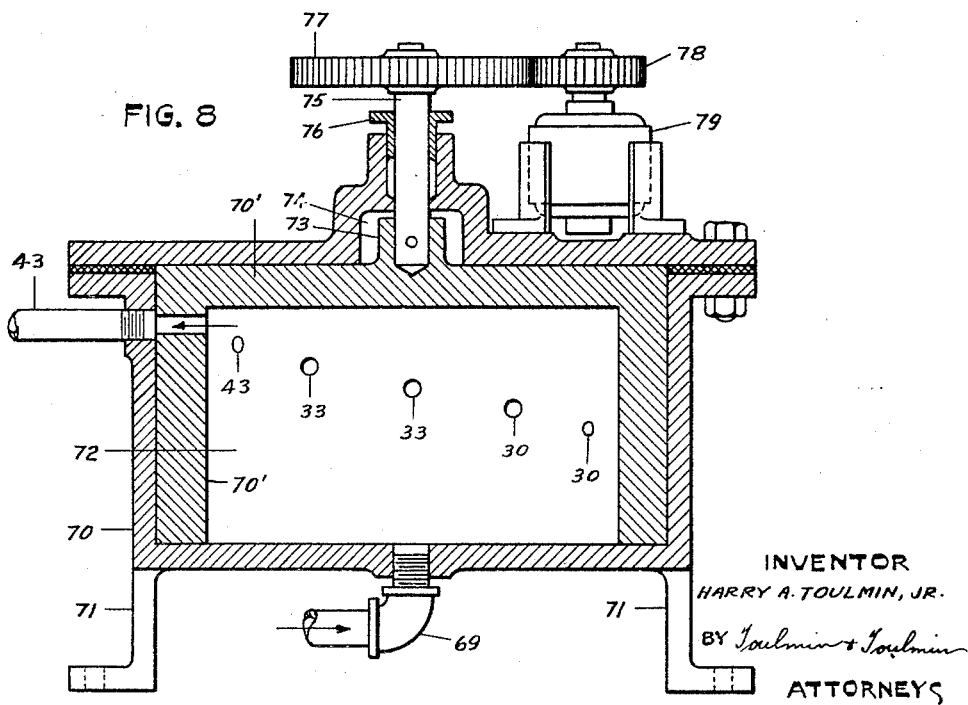
INVENTOR
HARRY A. TOULMIN, JR.
BY Toulmin & Toulmin
ATTORNEYS March 17, 1931. H. A. TOULMIN, JR 1,796,636
MACHINE FOR MANUFACTURING BUILDING MATERIAL
Filed June 25, 1928 10 Sheets-Sheet 8
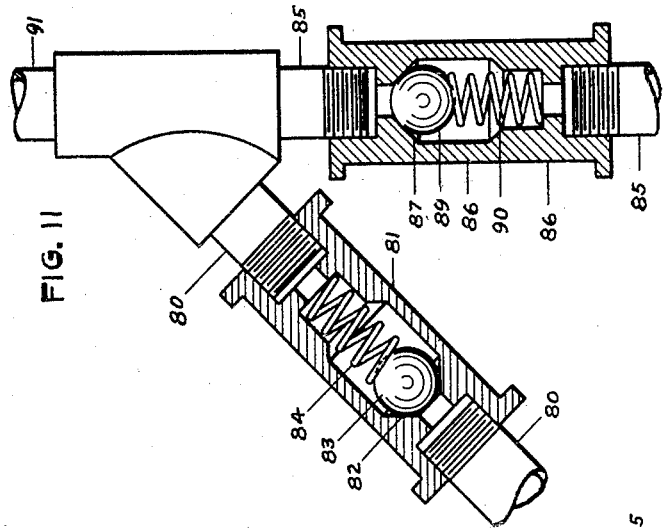
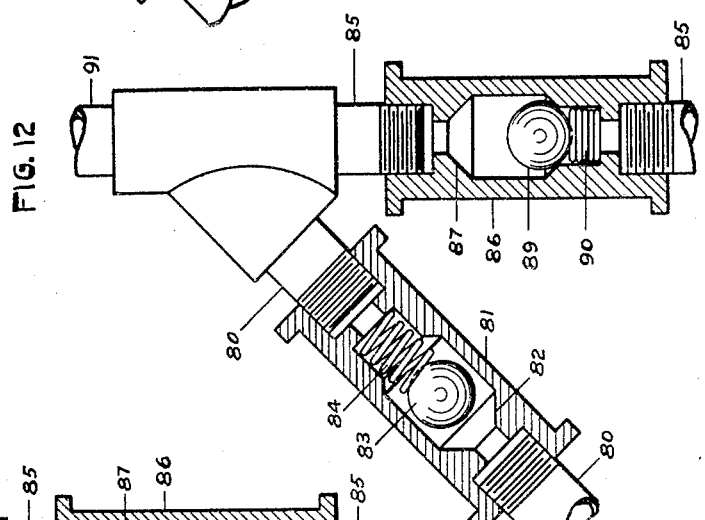
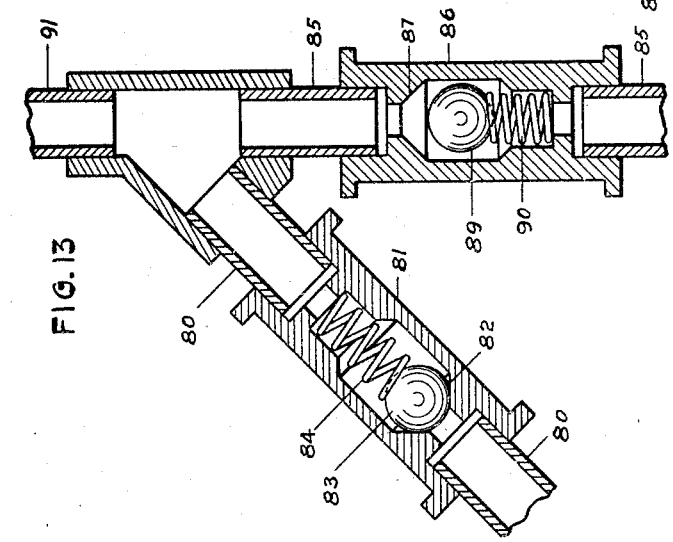
INVENTOR
HARRY A. TOULMIN, JR.
BY Toulmin + Toulmin
ATTORNEYS

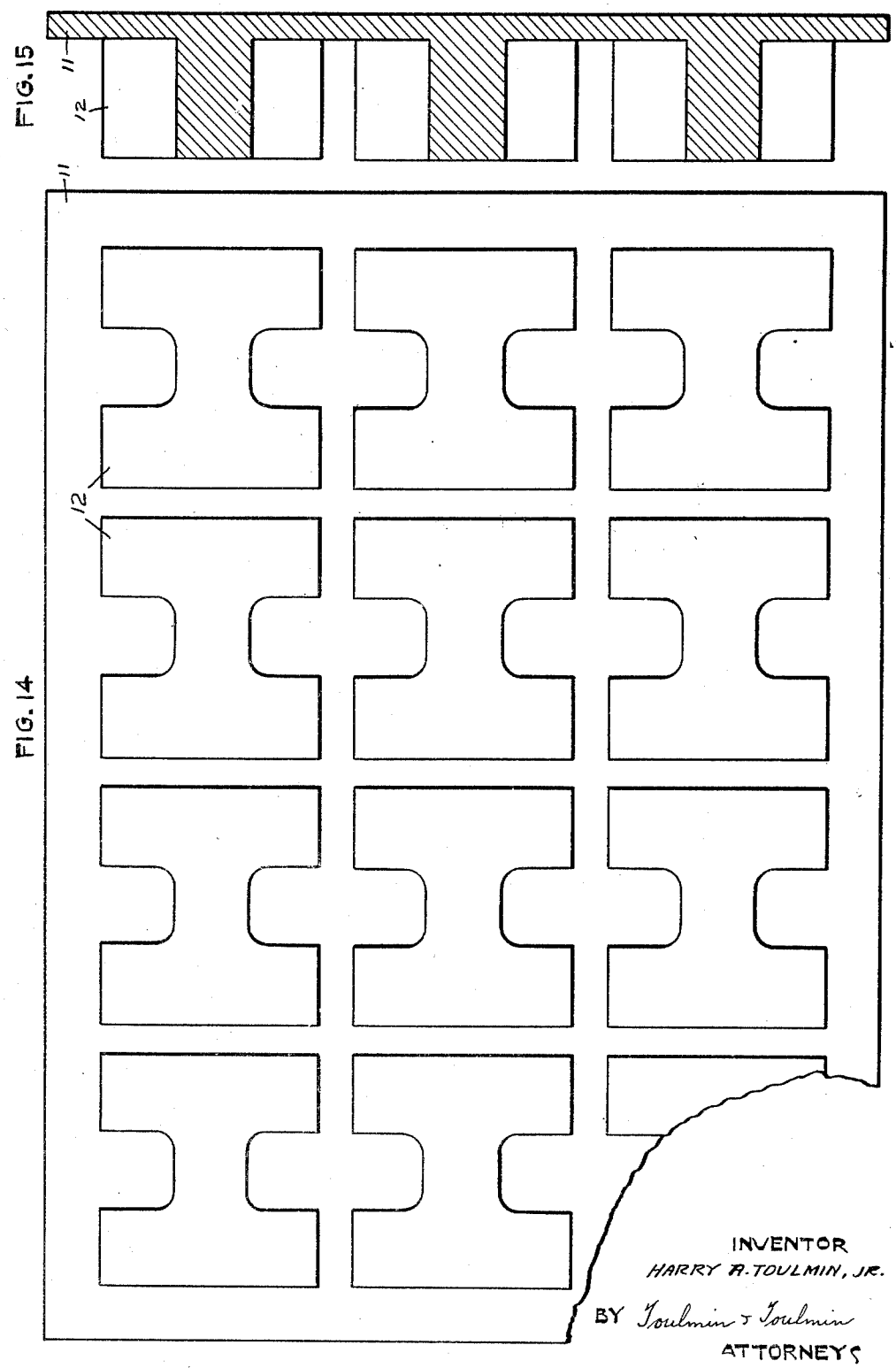

Patented Mar. 17, 1931

1,796,636

UNITED STATES PATENT OFFICE

HARRY A. TOULMIN, JR., OF DAYTON, OHIO, ASSIGNOR TO CEMROC, INC., OF CINCINNATI, OHIO, A CORPORATION OF OHIO

MACHINE FOR MANUFACTURING BUILDING MATERIAL

Application filed June 25, 1928. Serial No. 287,980.

This invention relates to machines for the manufacture of building material, and in particular, for the manufacture of building units of H-shape of concrete, ceramic material and other materials of like nature.

It is an object of this invention to provide a machine in which there is a movable mold box superimposed upon the pallet, which may be filled with plastic material, and to which a die is applied under a predetermined amount of pressure, such pressure being gradually applied with positive effect and result.

It is also an object of this invention to provide a machine of this type in which the pallet, mold box and other parts are automatically operated and the parts so timed as to effect the operations in proper sequence, each operation being performed in sufficient time to permit other succeeding operations to be performed.

It is a further object of this invention to provide a machine of this type in which the parts are reduced to a minimum and so related as to produce a machine compact in its nature, and one that may be operated with the least amount of human supervision.

A large series of these machines may be operated by one person since each part of each machine is automatic in its operation, and when once started the placing of the parts in proper position, the supplying of the material and the removal of the finished product from the machine is all automatic, only needing supervision for the purpose of seeing that no disorder in the machinery takes place.

For the purpose of illustration there is presented herewith one embodiment of this machine, which is merely by way of illustration, and it is understood that the invention is not limited to the particular form here shown.

In the drawings:

Figure 6 is a general view of the system of oil pipes with the motor and pump and the rotor which force and control the passage of oil to the respective cylinders for the purpose of operating the different parts of the machine.

Figure 7 is a top view of the rotor partially in section, and showing the rotor operating gear.

Figure 8 is a section of the rotor showing the inlet pipe and part of the outlet pipes.

Figure 9 is an outside view of the rotor showing the openings through which the oil or compression fluid passes from the rotor into the pipes.

Figure 10 is a view of the casing showing the openings in the casing which communicate with the openings in the rotor, and to which the pipes for conveying the fluid to the cylinders are attached and communicate.

Figures 11, 12 and 13 illustrate branches in the oil pipe and the valves for controlling the flow of the oil or fluid therethrough.

Figure 11 shows the valves in idle position.

Figure 12 shows the valves in pressure position, while Figure 13 shows the valves in return position.

Figure 14 is a plan view of the mold die.

Figure 15 is a sectional view of the mold die as shown in Figure 14.

Figure 16:
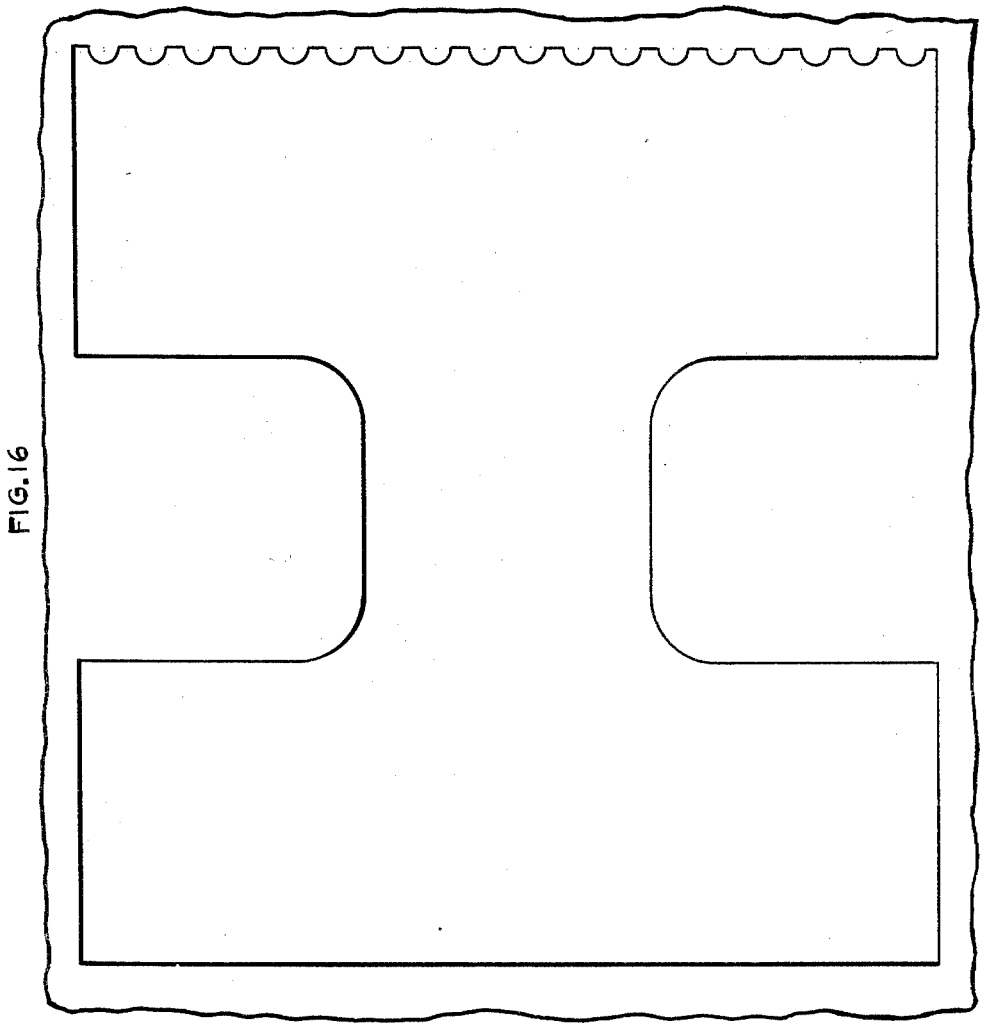
Figure 16 is a plan view of one section of a modified form of mold box, showing the ornamentation on the surface thereof.
Figure 17:
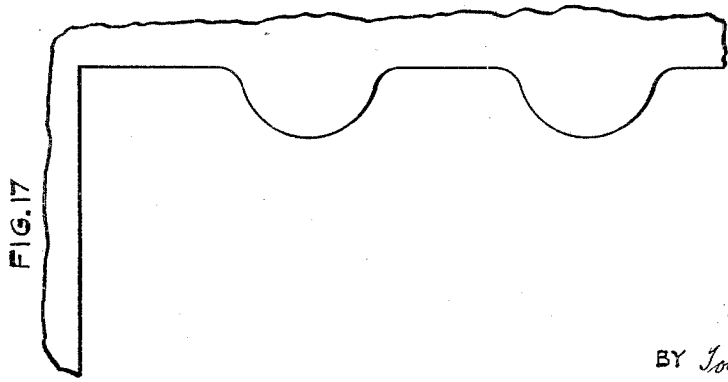
Figure 17 is an enlarged view of part of the mold box shown in Figure 16.

Referring to the drawings and the numerals thereon, the numeral 1 represents the frame or supports, of which there may be any number, preferably at least four, which are properly joined together by a base member 2, top supports 3 and intermediate cross pieces 4. These supports 1 form guides for the mold box 5. This mold box provides the dies for the purpose of shaping the units and is of the general shape, as shown in Figure 16. However, the mold box may carry dies of any shape, form or configuration.

To the mold box are suitably attached on each side thereof piston rods 6 by means of bracket members 7. These piston rods have on the end thereof pistons of the usual type and form, adapted to operate in cylinders 8, which are attached to the cross pieces 4, as indicated by the numeral 9.

Leading from the cylinders 8 are pipes 10. These pipes lead to the part of the machine adapted to force out and receive oil to and from the cylinders.

Suitably mounted upon the supports 1 is a press member 11, which has extending downwardly therefrom plungers 12 of a form adapted to fit within the molds of the mold box. This press is located immediately above the mold and is adapted to cooperate with and engage the molds for the purpose of pressing the material deposited within the molds. Attached to the upper horizontal surface of this press 11 is a piston rod 13, which has on the other end thereof a piston rod, not shown, which operates in the cylinder 14. The purpose of this cylinder, piston and piston rod is to operate the press and to bring the plungers into contact with the material in the mold box.

Leading from the cylinder 14 are oil pipes 15. These oil pipes lead to and from the oil distributing mechanism the same as do the oil pipes 10. This cylinder 14 is constructed of sufficient size, and is provided with oil in such a manner that a very high degree of pressure may be applied to the press 11, and this pressure may be applied and removed with sufficient rapidity that the placing of the parts in position, the depositing of the plastic material within the mold and the pressing of the material may all be done with great rapidity.

Suitably supported by the supports 1 and within the frame formed thereby are track members 16. The purpose of these track members is to support the hopper as it moves to position to discharge the plastic material into the molds.

Located to one side of the frame formed by the supports 1 is a stack of pallets. These pallets are indicated by the reference character 17. These pallets are placed in a stack in such a manner that they may be gradually elevated and fed onto the base for the purpose of supporting the mold box and its plastic content.

On each side of the stack of pallets there is provided a support 18 on the upper end of which is mounted a shaft 19, properly supported in bearings on the supports. On one or both ends of the shaft there may be located a ratchet wheel 20, which is engaged by a pawl 21 for the purpose of rotating the shaft and by holding pawl 21'. The shaft 19 also carries on each end, adjacent the ratchet wheel, a pulley 22 over which passes the rope 23, having on one end thereof a weight 24, while the other end is attached to a platform 25 by means of outstanding brackets 26.

This platform for the pallets may be suitably guided by the pallet support. The pallet hoisting means is operated by cylinders 27, in which operate piston rods 28, which have pivoted thereto arms 29. These arms 29 are pivotally mounted at their other ends on the shaft 19 and have the pawls 21 pivoted thereon. For the purpose of conveying oil to and from the cylinders 27 there are pipes 30 which lead to and from the oil distributing mechanism.

For the purpose of feeding the pallets from the stack of pallets onto the mold base there is provided a cylinder 31, which has provided therefor the supports 32. This cylinder 31 has the pipes 33 for the purpose of conducting oil to and from the cylinder in the manner described for pipes 30.

Figure 1:
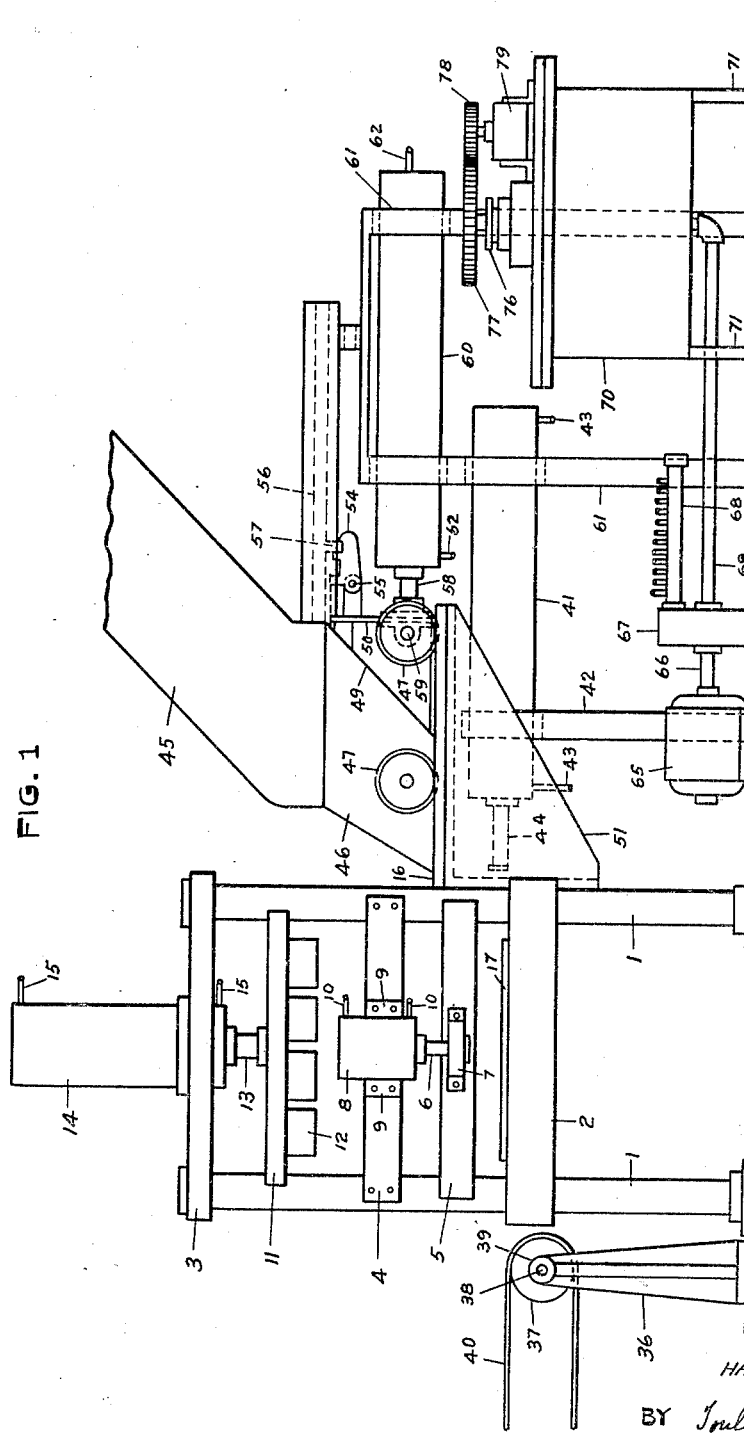
Figure 1 represents a side elevation of the machine with part of the oil pipes omitted.
Figure 2:
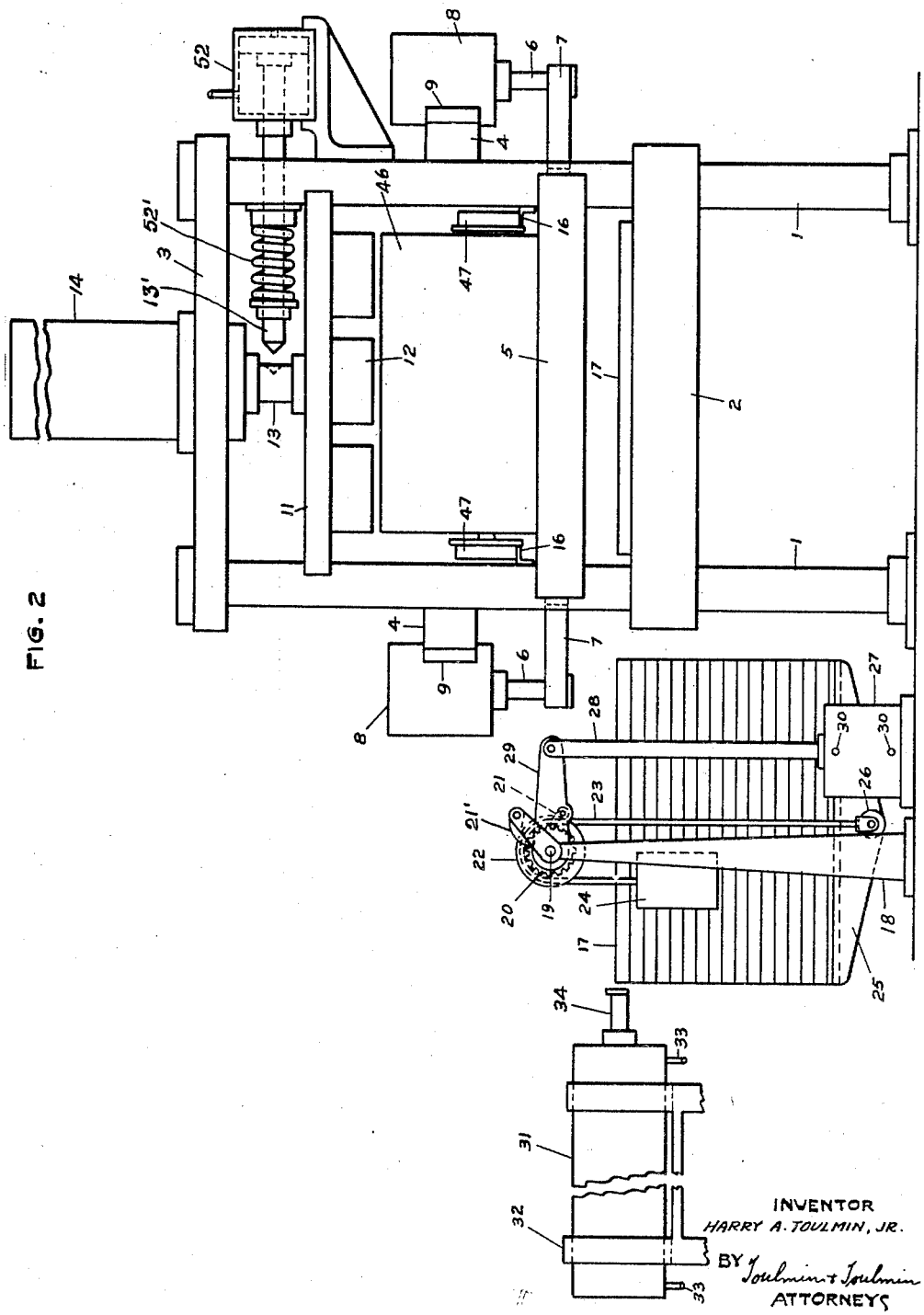
Figure 2 is a view of the machine showing the stack of pallets and the means for operating the pallets, together with the molds and the means for feeding the material to the mold box.
Figure 3:
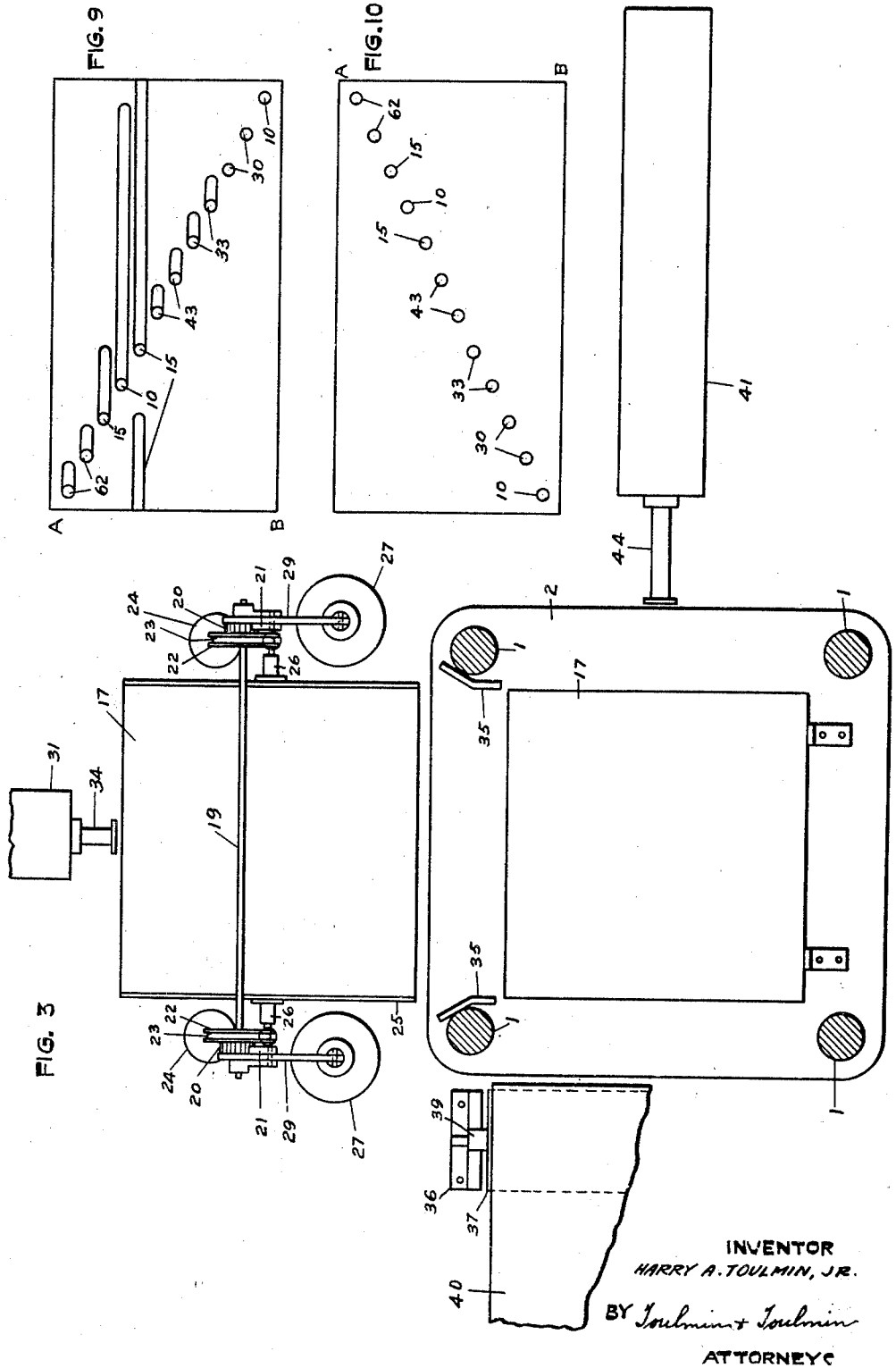
Figure 3 is a sectional plan view showing the stack of pallets and the platform upon which the pallets rest to support the mold box.

Fitting within this cylinder 31 is a piston of the ordinary type, which has attached thereto the piston rod 34. When the oil is conveyed to and from this cylinder the rod 34 is caused to move toward or from the stack of pallets. When the piston rod 34 moves over the stack of pallets one pallet is forced from the stack onto the base for the purpose of receiving thereon a mold box. For the purpose of guiding the pallet as it is forced from the stack onto the base guide members are provided, as indicated by the numeral 35, as shown in Figure 3.

For the purpose of conveying off the used pallet and the newly formed building blocks thereon a system of conveying is used. 36 represents the support for one end of the conveyor adjacent the machine. This support has mounted on the upper end thereof a roller 37, which has trunnions 38 on each end, which engage the bearings 39 on the upper end of the supports 36.

Passing around the roller 37 is a conveyor belt 40. This belt is suitably supported and operated by a similar construction to that just described at its other end. The pallet 17, with its contents, is forced onto this conveyor 40, which conveys it away from the machine. For the purpose of removing the pallet and its contents from the support there is provided a cylinder 41, which is suitably supported by the support members 42. This cylinder 41 is provided with the usual oil pipes 43, which convey oil to and from the oil propelling mechanism. Fitting within this cylinder is the usual piston with a piston rod 44. This piston rod 44 is adapted to engage the adjacent surface of the pallet 17 to remove the pallet and the molded blocks from the support onto the conveyor.

To lock the press in raised position there is a pin 13' operated by the cylinder 52 to release the press, and by spring 52' to lock the press. This cylinder is supplied with oil pressure direct from the pump during operation.

For the purpose of conveying the plastic material into the mold box there is provided a hopper 45, which is fixed immovably in relation to the other part of the machine. Just below the hopper 45 there is a movable section of the hopper 46, which is suitably supported by the rollers 47, which are supported by and moved along the track 16.

For the purpose of supporting the plastic mixture or material in the hopper 46 there is provided a suitable bottom 48, which extends to the adjacent edge of the mold box. As the hopper moves to discharging position it passes off the bottom 48 and over the mold box to fill the molds.

For the purpose of evenly distributing the plastic material in the fold forms, there is provided a distributing and pressing member 63, shown in Figures 4 and 5, which will be described later. As the hopper is withdrawn from the mold box the bottom 48 closes the hopper and prepares for the reception of more plastic material.

On each side of the movable hopper there are side members 49. Extending from the rearward part of the movable hopper is an extension 50, to which the hopper operating mechanism is attached. The sliding hopper and its associated parts are supported by a bracket 51 and other suitable supporting means.

There is also extending from the bracket 50 a second bracket 53, which has pivotally mounted thereon a catch member 54 at the point 55. This catch member is held in engagement by means of a spring 54'.

When the movable hopper section advances to mold-filling position the hopper section 45 needs to be closed, and for that purpose there is provided a sliding closure member 56 which has extending therefrom a lug member 57, which engages or is engaged by the catch member 54. As the hopper advances to mold-filling position the closure member 56 is advanced so as to close the hopper 45. But when the closure 56 reaches a certain point the catch 54 may be released so that the hopper may be advanced to proper filling position for the molds, and when the hopper is brought back to refilling position the closure 56 is carried with it, thereby opening the lower part of the hopper 45 for the admission of a fresh amount of plastic material into the moving hopper, the lower part of the moving hopper in the meantime having been closed.

For the purpose of operating the movable hopper, as before described, to mold-filling position and back, there is pivoted a piston rod 58 at the point 59 to the rear extensions 50 of the movable hopper 46. This piston rod 58 has on the other end thereof a piston, not shown, which fits and operates within the cylinder 60, which is suitably supported, as indicated by the numeral 61. Leading from this cylinder 60 are the usual oil pipes 62, which conduct oil to and from the oil distributing mechanism.

Figure 4:
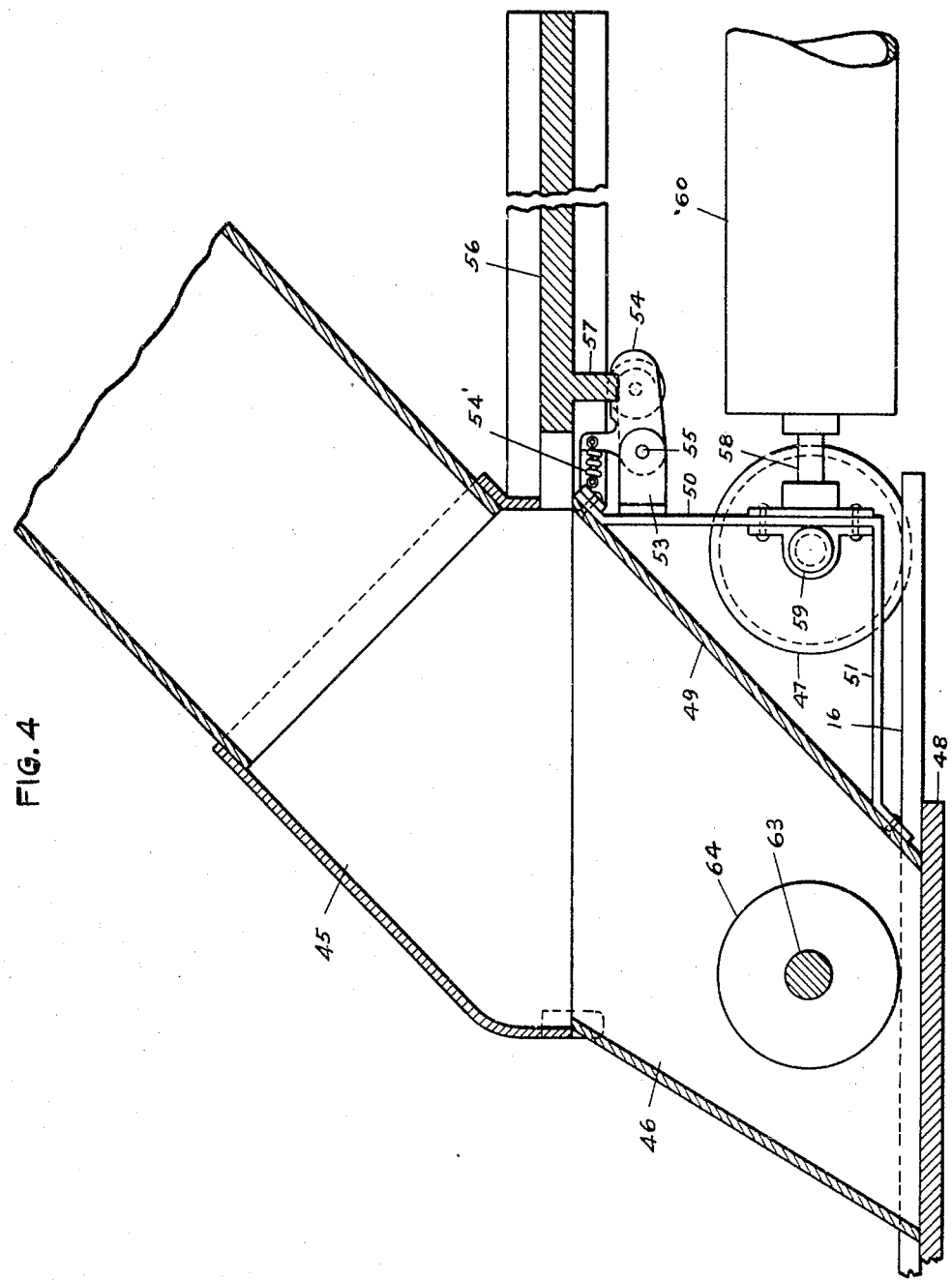
Figure 4 is a sectional view of the hopper with the accompanying roll support.
Figure 5:
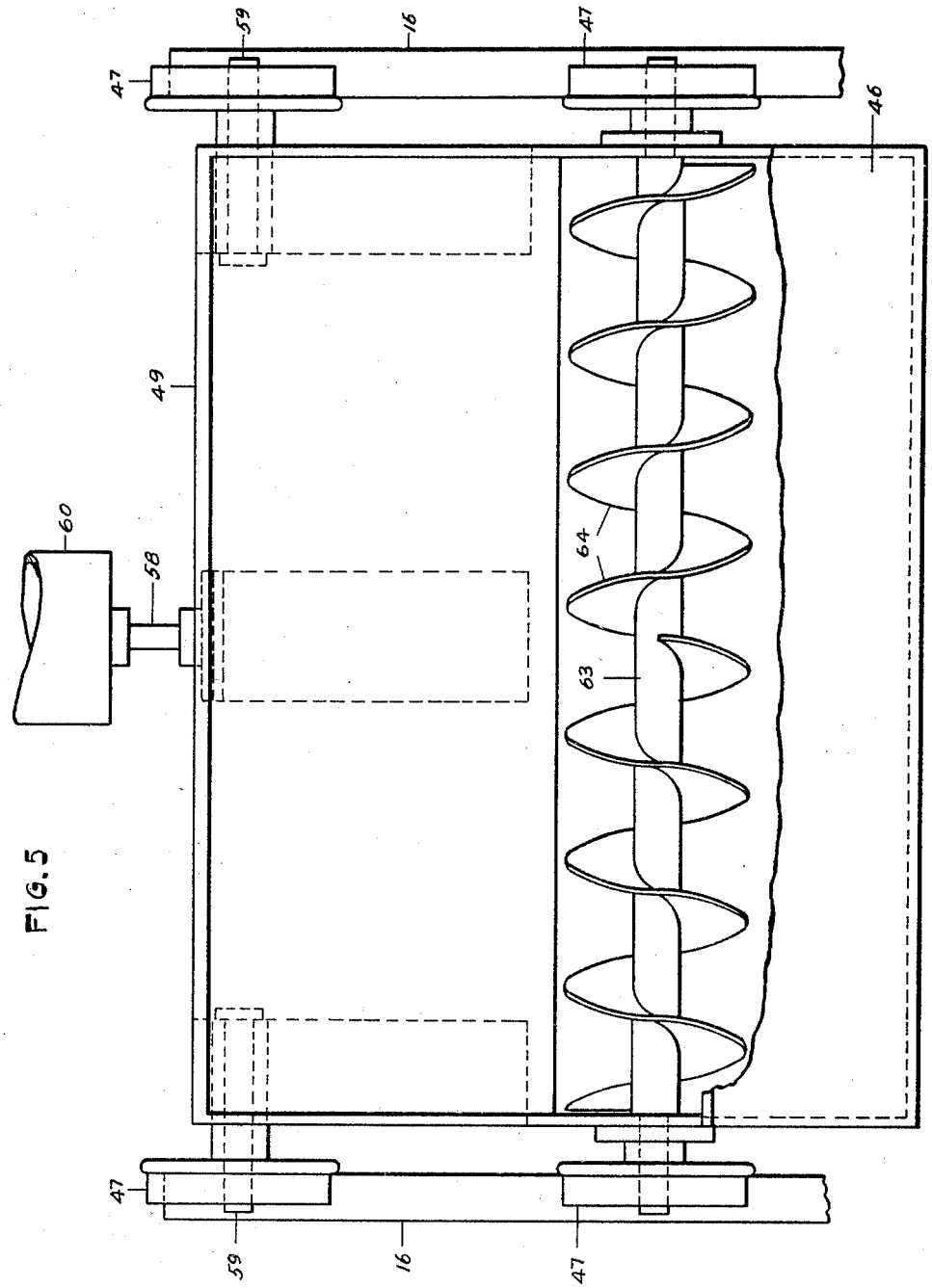
Figure 5 is a plan view of the hopper taken at right angles to that shown in Figure 4, and shows the spreader and equalizer.

The spreading and packing of the plastic mixture in the molds are accomplished by the stirrer or spreader 63, particularly shown in Figures 4 and 5. This stirrer has blades 64, which are adapted, as it rotates to distribute the plastic material over the mold box and at the same time serve to press the plastic material into the molds.

It will be noticed by an observation of Figure 5 that these blades are spiral in their disposition and while passing inwardly over the molds they rotate in one direction, and while passing outwardly they rotate in another direction, thereby effecting a fairly equal distribution of the plastic material and the proper pressing of the same within the molds.

For the purpose of distributing oil to all the above-described cylinders, there is provided a pump and oil distributing system, which is operated by a motor 65 and which has the usual motor shaft 66, to which is attached a pump 67. Leading to this pump is an intake pipe 68 and an outlet pipe 69. Through the pipe 69 the oil, or any other fluid used, is forced into and through the rotor where it is distributed to each of the before-mentioned pipes. This rotor is indicated by the numeral 70, which more particularly refers to the rotor casing.

Within the casing is mounted a rotor 70'. The whole rotor structure is supported on support members 71. The central part of the rotor is hollowed out in a cylindrical form, as indicated by 72, but closed at one end forming a cylinder with one end closed and the other one open.

On the closed end of the cylinder there is formed a lug 73, which has a hole therein in which is received a drive shaft 75. In the back part of the rotor casing there is provided a cavity 74 into which the lug 73 fits. The drive shaft 75 is supported in bearings 76, formed in the back part of the casing. On this shaft 75 is a gear member 77, which meshes with the pinion 78. This pinion 78 is on a motor shaft which is driven by a motor 79. This motor 79 controls the distribution of the fluid or oil into the pipes leading to and from the respective cylinders, and the time of the admission of oil into any particular pipe is controlled by the openings in the rotor casing and corresponding openings in the rotor. The pump mechanism merely controls the flow of the fluid and its pressure, having nothing to do with the time of the flow. By regulating the speed of the motor 79 the speed of the operation of the machine may be regulated.

Attention is directed to Figure 6, in which is shown the system of cylinders, pipes therefor and the rotor for distributing the oil. These parts are here shown diagrammatically. It will be noticed from an examination of this figure that each cylinder has a pipe at each end, and that each of these pipes branches, one branch leading to the rotor and the other to the intake pipe leading into the pump.

By this means and a system of valve structure, hereafter described, the oil can be forced by the rotor into either end of the cylinder depending upon what pipe is connected with the rotor pipe, and while the oil is being forced into one end of the cylinder the pipe leading from the other end of the cylinder is open for the conveyance of oil back into the intake pipe 68. By a suitable arrangement of the oil openings in the rotor the timing of the admission of oil to any part of the cylinder may be adjusted in any sequence necessary for the proper operation of the parts.

The valve mechanism used in connection with the pipes leading from the rotor to the cylinder and from the cylinder back to the intake pipe 68 is shown in Figures 11, 12 and 13. In Figure 11 there is shown the position of the valves while at rest. Figure 12 shows the position of the valves under pressure from the rotor. Figure 13 shows the position of the valves when there is no pressure from the rotor but the oil is being conducted from the cylinder back to the intake pipe 68.

For these figures, and these figures alone, the reference character 80 represents the pressure pipe,—that is, the pipe leading from the rotor and conducting oil from the rotor into the different cylinders. In this pipe there is inserted a valve mechanism indicated generally by the numeral 81 which has provided therein a valve seat 82 and a ball valve 83. For the purpose of holding this ball on a seat there is provided a spring 84. It will be noted also that these valves are located after the pipe leading from the piston branches, one branch leading to the rotor and the other to the intake pipe 68.

The return pipe is indicated by the numeral 85, which has inserted therein a valve, indicated generally by the numeral 86. In this valve is a seat 87 adapted to receive valve mechanism in the shape of a ball 89. This ball is held in seat by means of spring 90. The spring 90 is a weaker spring than spring 84 and so will yield more under pressure than will spring 84, which is in the pressure line.

The operation of this set of valves is as follows: When the pressure is in pipe 80, which we will say is one hundred pounds, the ball 83 is forced off of the seat so that the fluid will pass by and through the valve into the pipe 91 and toward the cylinders. Of course, this oil will be forced back into valve 86, but the spring that holds this valve being weaker than the spring that supports valve ball 83, will be entirely closed, forming a new valve seat with the ball 89 resting thereon, whereby the pipe 85 is completely closed. It is understood in this condition that the spring 90 will be absolutely compressed when the pressure is one hundred pounds, but that the spring 84 will be only something like half closed. Under this condition the line 85 is closed, the pipe 80 through the valve 81 is opened to the pipe 91, which leads to the cylinders.

When the reverse action takes place and the oil is being conducted back from the pistons through pipe 91 the valve 81 is closed, due to the action of spring 84, while valve 86 is open so that the fluid will pass from the cylinders, through pipe 91 into pipe 85 and into the intake pipe 68, and into the pump.

It is to be understood that the pressure of the oil leaving the cylinder going to the pump is less than the pressure of the oil under pressure condition so that the pressure on the valve 89 is not sufficient to close the spring, but is sufficient to open the valve and permit the return of the oil so the oil passes through the valve back to the pump.

Operation

Assuming that a pallet has been removed from the stack of pallets and is in proper position on the base 2 for the reception of the mold form, the machinery is started, the parts are adjusted in such a way that oil or fluid is conveyed into the cylinders 8 and the mold box 5 is lowered upon the pallet 17. While the mold box is in this position oil or fluid is admitted into cylinder 60 in such a way as to force the movable part of the hopper forward over the mold box for the purpose of depositing plastic mixture in the mold box.

As soon as this deposit is made this hopper must be immediately withdrawn, making it necessary to admit oil into the reverse end of the cylinder, and consequently the pipes must be sufficiently adjusted at the rotor for that purpose. As soon as the movable hopper is withdrawn the press and its plungers 12 are lowered by means of the cylinder 14. This press and plungers engage the plastic material that has been deposited in the mold box and press it and cause it to become a compact and consistent mass of the proper form.

While this press is in pressing position the rotor has come to the point in its rotation where the oil that has been admitted to cylinders 8 for the purpose of lowering the molds is shifted, the pressure oil being withdrawn back to the pump and pressure applied to the lower part of the cylinder for the purpose of raising the mold box. In this raising operation of the mold box the press and plungers are still in the pressing condition, whereby the plastic material formed in the molds is held down while the mold box is raised, thereby stripping the mold box from the form blocks.

After the mold box has been thus raised the admission of oil to cylinder 14 is reversed, the press and plungers are raised so that the pallet 17 and its load of blocks are free and ready to be moved to the conveyor. At this time oil is admitted to the cylinder 41 in such a way as to force the piston 44 in the direction of the pallet 17, whereby the pallet with its load is forced onto the conveyor 40. When the pallet 17 and its load have been forced off of the base 2, oil is admitted to the cylinder 27, and as far as that is concerned may have been admitted before at any convenient time, in such a way as to raise the stack of pallets so that the next highest pallet can be forced onto the base 2. This is done by the admission of oil to cylinder 31, which forces the top pallet onto the base 2, where it is in position to receive the mold box and the plastic material, and the operation just described in regard to the formation of the plastic material in the building blocks is again carried out.

The sequence of action on the part of each cylinder is determined by the relative position of the openings in the rotor and the rotor casing, whereby the conveyance of oil from the pump into the various pipes is determined and the proper sequence effected. The relative position must be arranged so as to effect the relative operation of the parts, as hereinbefore described.

There is shown in Figures 9 and 10 the relative arrangement of the rotor and the rotor casing, with the ports therein leading to the respective pipes to the different cylinders. That is thought sufficient to adequately illustrate one form of the arrangement of the ports in the rotor and the casing for the purpose of conveying oil under pressure to the respective cylinders in the proper sequence. It is understood, of course, that Figure 9 represents the rotor while Figure 10 represents the outer casing in which the rotor rotates.

If the parts of Figure 9, indicated by the letters A and B, are brought into position with the part shown in Figure 10 so that the bar A of Figure 9 comes in contact with the bar A of Figure 10, and the bar B of Figure 9 comes in contact with the bar B of Figure 10, and the rotor is moved toward the lefthand, the proper sequence of action will take place so that the oil is delivered to and from the cylinders so as to produce the desired pressure and for the desired length of time.

According to this showing, the holes 62 will align with each other first, and the hopper will be moved into feeding position and back, due to the hole 62 of Figure 9 coming in contact with hole 62 of Figure 10. After the hopper has been placed in feeding position and drawn back, the press then is applied to the material in the mold and held there for some period, as indicated by the first numeral 15 of Figure 9.

After the press has been applied to the plastic material in the mold, and during the time of the pressure, the mold box begins to rise and strip the plastic material formed into blocks, and after the mold has risen substantially the height of the blocks the press then begins to rise, as indicated by the numeral 15 of Figure 9. The pressure is maintained in the pipes 10 and 15 so as to hold the box up until it is desired that it be replaced for filling purposes, and the press is held up, as indicated by the long slot in Figure 9, indicated by the second numeral 15, until it is desired to lower the press after the box has again been filled with material.

After the press has been raised and the box removed from the formed blocks, the pallet with the blocks thereon is unloaded from the support and the unloading means brought back to its normal position, as indicated by the numeral 43 designating the oil ports in Figure 9. These ports each fit into ports correspondingly numbered in the rotor casing, shown in Figure 10. After the pallet, with the formed blocks, has been removed other pallets are fed onto the form, as indicated by the numeral 33, next in succession after the removal of the pallet. Of course, these actions of feeding and removing the feeding means from the pallet follow each other in rapid succession. Of course, the pallets are fed from the stack. This is merely done by an up and down movement of the piston, which forces the oil through the pipes 30.

While these ports are shown in the figure in such a way as to make this action take place immediately after the pallets have been fed onto the support, this action may take place at any convenient time between the feeding of the pallet onto the support and the removal of the pallet from the support.

The next step after a pallet has been placed on the support is to lower the mold box. This is done by means of oil being forced through pipes 10 and openings 10. The oil used is extremely heavy, and is sufficient in quantity to keep the pipes and the cylinders, the rotor and the pump substantially full at all times so that a slight movement of the pump and the rotor produces the desired pressure at the desired point instantaneously.

By this device it has been found possible to obtain a pressure on the blocks of something like forty pounds, and at that with great speed and rapidity, so that in a short time the plastic material may be compressed into a solid block from which the mold may be immediately removed without the block falling to pieces.

The gearing mechanism between the rotor and the motor is sufficiently reduced in order to make the rotation of the rotor sufficiently slow to perform the functions desired. The rotor has nothing to do except to control the direction of the oil as it is forced from the pump, through the different pipes, to the different parts of the cylinders.

I desire to comprehend within my invention such modifications as may be clearly embraced within my claims and the scope of my invention.

Having thus fully described my invention, what I claim is new and desire to secure by Letters Patent, is:

1. In a building material machine, a support, means for supporting a stack of pallets adjacent said support, means for elevating said stack step by step, and means for feeding said pallets to the support one at a time at stated intervals.

2. In a building material machine, a support, means for supporting a stack of pallets adjacent said support, fluid operative means for elevating said stack of pallets step by step, and means for feeding said pallets to the support one at a time.

3. In a building material machine, a support, means for supporting a stack of pallets adjacent said support, fluid operative means for elevating said stack of pallets step by step, and fluid operative means for moving said pallets to the support one at a time at stated intervals.

4. In a building material machine, a support, means for feeding pallets to said support at stated intervals, means for placing a mold upon said pallet, and means for filling the mold with plastic material, all of said means being operated by a common continuously operating rotor and pump means.

5. In a bulding material machine, a support, means for placing pallets upon the support at regular intervals, means for lowering a mold upon said pallet, means for filling the mold with plastic material, means for gradually applying pressure to said plastic material, means for removing the pressure, raising the mold and ejecting the pallet from the support and a pump and rotor means for continuously operating all of said means in proper succession.

6. In a building material machine, a support, means for placing pallets upon the support at regular intervals, means for lowering a mold upon said pallet, means for filling the mold with plastic material, means for gradually applying pressure to said plastic material, means for removing the pressure, raising the mold just before pressure is removed and ejecting the pallet from the support, and conveyor means for conveying the pallet away from the support.

7. In a building material machine, a support, means to place a pallet upon said support, a mold, means for lowering the mold upon the pallet, means for filling the mold with plastic material, means for pressing the plastic material, means for raising the pressure means and the mold, and means for removing the pallet with the plastic material thereon to a conveyor and a common operating means for all of said means, said last named means including a pump and a rotor and a pipe leading from each means to the pump and rotor.

8. In a building material machine, a support, a pallet thereon, a mold, fluid means for lowering the mold upon the pallet, fluid operative means for depositing plastic material in the mold, means for applying pressure to the plastic material in the mold, means for elevating the mold while the pressure means is still operating, means to remove the press means, and means to eject the pallet with the plastic material thereon, all of said means being operated by a common operating means.

9. In a building material machine, a support, a pallet upon said support, fluid means for placing a mold upon said pallet, fluid means for applying plastic material to said mold, fluid means for removing said mold from said plastic material, and means to remove said pallet and plastic material thereon from said support.

10. In a building material machine, means to support a mold, a mold upon said support, automatic means for feeding plastic material to said mold, automatic means for pressing the plastic material in said mold, automatic means for removing the mold from said plastic material and ejecting said plastic material from the support and a continuously rotating cylinder cooperating with each of said automatic means for the proper successive operation of said automatic means.

11. In a building material machine, a mold, means to feed plastic material to said mold, fluid pressure means for applying pressure to said plastic material in the mold, fluid pressure means for removing the mold from the plastic material while pressure is applied, means for removing the pressure, and means for ejecting the plastic material from the supporting means.

12. In a building material machine, a mold, means for feeding plastic material to the mold, means for applying pressure to the plastic material within the mold, fluid pressure means for removing the mold from the plastic material while under pressure, fluid pressure means for removing the pressure from the plastic material, and fluid pressure means for removing the plastic material from the support means, all operated by a common operating means.

13. In a building material machine, a fixed support, means for forming plastic material into building units on said support, and automatically operated fluid pressure means for removing the building units from said support after being formed.

14. In a building material machine, a fixed support, means for forming plastic material into building units on said support, fluid operative means for removing said building units from the support, and conveyor means for conveying said units away.

15. In a building material machine, a fixed support, means mounted on said support for forming building units of plastic material, means for removing said building units from said support, all of said means being operated by a fluid pressure means.

16. In a building material machine, a fixed support, means for placing a pallet upon said support, means for mounting a mold upon said pallet, means for supplying plastic material to said mold, means to apply pressure to said plastic material within said mold, and means to release the mold and pressure means from the plastic material, and means to remove the pallet and the plastic material thereon from the support, all of said means being operated in succession by a common operating means.

17. In a building material machine, a fixed support, means on said support for forming plastic material into building units, means for removing said units from said support, all of said means being fluid operated from a common source of fluid pressure.

18. In a building material machine, a fixed support, means for feeding pallets to said support, means for locating a mold on said pallet, means for placing plastic material within said mold, means for applying pressure to said plastic material to form building units, means to remove the pressure and release the building units and remove them from the support, all of said means being operated in succession by fluid pressure, and rotor means for controlling the application of fluid pressure to operate the foregoing means in proper succession.

19. In a building material machine, a plurality of cylinders having pistons therein, a fluid pressure means, pipes leading from the fluid pressure means to the cylinders, and means located in the pipes between the cylinders and the fluid pressure means to control and direct the flow of the fluid from the pressure means to the cylinders and from the cylinders back to the pressure means.

20. In a building material machine, a plurality of cylinders having pistons therein, a source of fluid pressure, pipes leading from the source of fluid pressure to the cylinders, one pipe to each end of each cylinder, and a common located in each pipe operated by pressure therein for directing the flow of the fluid to the cylinders in such a way that the pistons may be operated in and from the cylinders.

21. In a building material machine, means for applying pressure, said means including a series of cylinders, a source of pressure, a series of pipes leading from said source of pressure to said cylinders, and rotor means associated with said pipes and source of pressure to control the delivery of pressure from the pressure means to the cylinders.

22. In a building material machine, means for applying pressure, said means including a series of cylinders having pistons therein, a source of pressure, a series of pipes leading from said source of pressure to said cylinders, and rotor means associated with said pipes and source of pressure to control the delivery of pressure from the pressure means to the cylinders.

23. In a building material machine, means for applying pressure including a cylinder, pressure producing means, a rotor, a pipe leading from the pressure producing means to the rotor, a pipe leading from one end of the cylinder having branches, one of which goes to the rotor and the other to the pressure producing means, a second pipe from the other end of the cylinder having branches, one of which leads to the rotor and the other to the pressure producing means, and valves located in each of said branches to control the flow of fluid through the pipes from the rotor to the cylinder and from the cylinder to the pressure means.

24. In a building material machine, means for applying pressure including a cylinder, pressure producing means, pressure distributing means, a pipe leading from the pressure producing means to the pressure distributing means, a pipe leading from one end of the cylinder having branches, one of which goes to the pressure distributing means and the other to the pressure producing means, a second pipe from the other end of the cylinder having branches, one of which leads to the pressure distributing means and the other to the pressure producing means, and valves located in each of said branches to control the flow of fluid through the pipes from the pressure distributing means to the cylinder and from the cylinder to the pressure means.

25. In a building material machine, means for applying pressure including a cylinder, pressure producing means, pressure distributing means, a pipe leading from the cylinder, said pipe dividing into two branches, one branch leading to the pressure distributing means, the other branch leading to the pressure producing means, and means in said branches to control the flow of fluid from the pressure distributing means to the cylinder and from the cylinder to the pressure producing means.

26. In a building material machine, means for applying pressure including a cylinder, pressure producing means, pressure distributing means, a pipe leading from the cylinder, said pipe dividing into two branches, one branch leading to the pressure distributing means, the other branch leading to the pressure producing means, and pressure operated means in said branches to control the flow of fluid from the pressure distributing means to the cylinder and from the cylinder to the pressure producing means.

27. In a building material machine, means for applying pressure including a cylinder, pressure producing means, pressure distributing means, a pipe leading from each end of the cylinder, said pipes branching into two branches, one branch leading to the pressure producing means, the other branch leading to the pressure distributing means, and pressure control means in said branches to control the flow of the fluid from the pressure distributing means to the cylinder and from the cylinder to the pressure producing means.

28. In a building material machine, a support, means for feeding a pallet to said support, means for locating the mold on said pallet, means for placing plastic material within said mold, means for producing pressure on said plastic material within the mold, means for removing the pressure and the mold from the plastic material, and removing the complete unit and the pallet from the support, and a common continuously operated fluid means for operating and controlling in proper succession each of the foregoing means.

29. In a building material machine, a support, means for feeding a pallet to said support, means for locating a mold on said support, means for feeding plastic material to said mold, means for applying pressure to said plastic material to form building units, means for first removing the mold from the building unit, and thereafter remove the pressure therefrom, and means to remove the pallet and building units thereon from the support, all of said means being operated in succession so that a pallet is fed to the support and held on said support until the building units are completely formed and the pressure is applied and maintained until the mold is removed from the building unit.

30. In a building material machine, a fixed support, means for automatically feeding pallets to the support, means for applying a form to the pallet on the support, means for delivering plastic material to the form, and hydraulic means for applying pressure to the plastic material in the form.

31. In a building material machine, a fixed support, means for feeding pallets to the support, means for placing a mold upon a pallet on the support, means for placing plastic material in the mold, hydraulic means for applying pressure to the plastic material in the molds, and a common means for actuating each of the foregoing means automatically and in proper succession.

In testimony whereof, I affix my signature.

HARRY A. TOULMIN, Jr.